(12) United States Patent
Elbashir et al.

(10) Patent No.: US 12,116,278 B2
(45) Date of Patent: Oct. 15, 2024

(54) CATALYSTS FOR CONVERTING CARBON DIOXIDE AND METHANE TO SYNTHESIS GAS

(71) Applicant: Qatar Foundation for Education, Science and Community Development, Doha (QA)

(72) Inventors: Nimir Elbashir, Doha (QA); Chatla Anjaneyulu, Doha (QA); Minhaj Mohammed Ghouri, Doha (QA)

(73) Assignee: QATAR FOUNDATION FOR EDUCATION, SCIENCE AND COMMUNITY DEVELOPMENT, Doha (QA)

( * ) Notice: Subject to any disclaimer, the term of this patent is extended or adjusted under 35 U.S.C. 154(b) by 694 days.

(21) Appl. No.: 17/417,933

(22) PCT Filed: Dec. 27, 2019

(86) PCT No.: PCT/QA2019/050016
§ 371 (c)(1),
(2) Date: Jun. 24, 2021

(87) PCT Pub. No.: WO2020/139094
PCT Pub. Date: Jul. 2, 2020

(65) Prior Publication Data
US 2022/0055895 A1 Feb. 24, 2022

Related U.S. Application Data

(60) Provisional application No. 62/785,473, filed on Dec. 27, 2018.

(51) Int. Cl.
| | | |
|---|---|---|
| C01B 3/40 | (2006.01) | |
| B01J 21/04 | (2006.01) | |
| B01J 23/72 | (2006.01) | |
| B01J 23/755 | (2006.01) | |
| B01J 37/02 | (2006.01) | |

(52) U.S. Cl.
CPC .............. *C01B 3/40* (2013.01); *B01J 21/04* (2013.01); *B01J 23/72* (2013.01); *B01J 23/755* (2013.01); *B01J 37/0201* (2013.01); *C01B 2203/0238* (2013.01); *C01B 2203/1058* (2013.01); *C01B 2203/1076* (2013.01); *C01B 2203/1082* (2013.01); *C01B 2203/1241* (2013.01)

(58) Field of Classification Search
CPC .......... B01J 21/04; B01J 23/72; B01J 23/755; B01J 37/0201; C01B 3/40; C01B 2203/0238; C01B 2203/1058; C01B 2203/1076; C01B 2203/1082; C01B 2203/1241; C22C 9/06; C22C 19/002; C01P 2002/72

USPC ............. 502/331, 337, 345; 420/457, 485; 423/653, 654, 418.2
See application file for complete search history.

(56) References Cited

U.S. PATENT DOCUMENTS

| | | | | |
|---|---|---|---|---|
| 4,657,888 | A | * | 4/1987 | Mesters .................. B01J 23/74 502/330 |
| 4,725,573 | A | * | 2/1988 | Mesters ................ C07C 1/0445 502/331 |
| 11,779,915 | B2 | * | 10/2023 | Boualleg .................. B01J 37/08 502/337 |
| 2017/0001176 | A1 | | 1/2017 | D'Souza et al. |
| 2018/0104672 | A1 | | 4/2018 | Chenevier et al. |

FOREIGN PATENT DOCUMENTS

| | | | | | |
|---|---|---|---|---|---|
| CN | 103007945 | A | * | 4/2013 | ............ B01J 23/755 |
| CN | 106512999 | A | * | 3/2017 | .............. B01J 23/78 |
| WO | 2018203836 | A1 | | 11/2010 | |
| WO | 2016201218 | A2 | | 12/2016 | |
| WO | 2018104736 | A1 | | 6/2018 | |

OTHER PUBLICATIONS

Jae-Hee Lee et al., "Stabilization of Ni/Al2O3 catalyst by Cu addition for CO2 reforming of methane." Applied Catalysis A: General 269, pp. 1-6. (Year: 2004).*
Oh-Shim Joo et al., "CH4 Dry Reforming on Alumina-Supported Nickel Catalyst." Bull. Korean Chem. Soc., vol. 23, No. 8, pp. 1149-1153. (Year: 2002).*
Willinton Y. Hernandez et al., "One-pot preparation of Ni—Cu nanoparticles supported on γ-Al2O3 as selective and stable catalyst for the Guerbet reaction of 1-octanol." Catalysis Communications 98, pp. 94-97. (Year: 2017).*
Gian Paolo O. Bernardo, M.S., Ph. D et al., "Ab initio molecular dynamics thermal decomposition of methane on Ni—Cu/ γ-Al2O3 catalysts for CNT production: Effect of Cu promoter." Computational Condensed Matter 11, pp. 20-26. (Year: 2017).*
Sanjay Srivastava et al., "Synergism studies on alumina-supported copper-nickel catalysts towards furfural and 5-hydroxymethylfurfural hydrogenation." Journal of Molecular Catalysis A: Chemical 426, pp. 244-256. (Year: 2017).*
Ali Awad et al., "Non-oxidative decomposition of methane/methanol mixture over mesoporous Ni—Cu/Al2O3 Co-doped catalysts." International Journal of Hydrogen Energy 44, pp. 20889-20899. (Year: 2019).*

(Continued)

*Primary Examiner* — Patricia L. Hailey
(74) *Attorney, Agent, or Firm* — K&L Gates LLP (57) ABSTRACT

Catalysts for converting carbon dioxide and methane to synthesis gas include an alumina supported copper-nickel alloy composition having the formula $Ni_xCu_y$. The catalyst comprises about 70% to about 98% by weight of alumina in the catalyst, wherein x is an atomic percentage nickel content and y is an atomic percentage copper content, and wherein a ratio of x to y is about 3:1 to about 10:1. In one embodiment, the Ni—Cu catalyst composition according to the present disclosure is derived by state of the art electronic structure calculations based on Density Functional Theory (DFT).

32 Claims, 8 Drawing Sheets

(56) References Cited

OTHER PUBLICATIONS

Loredana De Rogatis et al., "NixCuy/Al2O3 Based Catalysts for Hydrogen Production", Energy & Environmental Science, vol. 1, pp. 501-509. (Year: 2008).*
Elham Baktash et al., "Alumina coated nickel nanoparticles as a highly active catalyst for dry reforming of methane." Applied Catalysis B: Environmental 179, pp. 122-127. (Year: 2015).*
S. Tajammul Hussain et al., "Effect of surface structure on the catalytic behavior of Ni:Cu/Al and Ni:Cu:K/Al catalysts for methane decomposition." Journal of Natural Gas Chemistry 17, pp. 374-382. (Year: 2008).*
L. B. Avdeeva et al., "Coprecipitated Ni-alumina and Ni—Cu-alumina catalysts of methane decomposition and carbon deposition. II. Evolution of the catalysts in reaction." Applied Catalysis A: General 141, pp. 117-129. (Year: 1996).*
Seyedeh Molood Masoom Nataj et al., "Modeling and optimization of methane dry reforming over Ni—Cu/Al2O3 catalyst using Box-Behnken design." Journal of Energy Chemistry 27, pp. 1475-1488. (Year: 2018).*
Iker Obregon et al., "Structure-activity relationships of Ni—Cu/Al2O3 catalysts for γ-valerolactone conversion to 2-methyltetrahydrofuran." Applied Catalysis B: Environmental 210, pp. 328-341. (Year: 2017).*
International Search Report and Written Opinion for related International Application No. PCT/QA19/50016; report dated Jul. 16, 2021; (8 pages).

* cited by examiner

Figure 1 (Figure 1(i)-Figure (ii) and Figure 1(a)-Figure 1(d))

Figure 2

Figure 3 (Figure 3(a), left and Figure 3(b), right)

CATALYSTS FOR CONVERTING CARBON DIOXIDE AND METHANE TO SYNTHESIS GAS

CROSS-REFERENCE TO RELATED APPLICATIONS

This application is the National Stage filing under 35 U.S.C. 371 of International Application No. PCT/QA2019/050016, filed on Dec. 27, 2019, which claims the priority to U.S. Provisional Patent Application No. 62/785,473, filed Dec. 27, 2018, which is hereby incorporated by reference in its entirety for all purposes.

BACKGROUND

Dry Reforming of Methane (DRM) is one of the $CO_2$ utilization processes in which $CO_2$ reacts with methane to produce synthesis gas (also denoted "syngas"), a valuable commodity consisting of a mixture of $H_2$ and CO gases with a $H_2$/CO ratio close to unity. Syngas is a precursor for the production of various high-value added petrochemicals and cleaner fuels. Although in practice synthesis gas has been mainly produced by mature processes like steam reforming of methane, partial oxidation and auto-thermal reforming of methane, DRM reaction is still of considerable interest because of its desirable aspects such as contribution to the mitigation of two greenhouse gases ($CO_2$ and $CH_4$).

These tremendous advantages have led to several attempts toward achieving industrial application of the reaction (Challiwala et al., *Computer Aided Chemical Engineering*, 40: 1993-1998). However, DRM is a highly endothermic reaction, with the high temperature being required to reach high conversions. One of the major challenges for the commercialization of the DRM process is catalyst deactivation via metal sintering, and coke deposition and many studies have been devoted to tackling these issues. Although noble metals show high conversion (Zhang et al., *International Journal of Hydrogen Energy* 2018, 43 (32), 15030-15054), slow deactivation rates and minimal coke formation, their use in large-scale applications is limited due to the high cost and low abundance. Several alternative catalysts have been explored for this reaction, including noble metals such as Rh and Pt. Even though these metals are found to be more reactive, as well as more resistant to carbon deposition, their high cost generally hinders their use.

To decrease the cost for commercial production, use of non-precious metals, especially, nickel-based catalysts is preferred because of their lower price and higher abundance. Unfortunately, carbon deposits form more readily on nickel than on noble metal surfaces during the reaction, leading to rapid deactivation of the catalyst. In recent years, several studies have attempted to improve the DRM performance of $Ni/Al_2O_3$ catalysts through several techniques, including the addition of promoters. Compared to monometallic catalysts, bimetallic catalysts often show better DRM performance regarding activity and stability (Egawa et al., *Journal of Catalysis* 2018, 358, 35-42).

The superior catalytic activity of nickel-based catalysts and also their relatively lower costs make them the most promising catalyst for this reaction. However, these catalysts are also subjected to rapid deactivation owing to their high susceptibility to coke formation and filamentous carbon deposition via methane cracking (Eq. 2) or reverse Boudouard reaction (Eq. 3). This major drawback is obstructing the widespread commercialization of DRM using nickel-based catalysts.

Dry Reforming of Methane $$CH_4 + CO_2 \rightarrow 2H_2 + 2CO \quad \Delta H°_{298K} = +247 \text{ kJ/mol}. \quad (1)$$

Methane Cracking $$CH_4 \rightarrow 2H_2 + C \quad \Delta H°_{298K} = +75 \text{ kJ/mol}. \quad (2)$$

Reverse Boudouard Reaction $$2CO \rightarrow CO_2 + C \quad \Delta H°_{298K} = -172 \text{ kJ/mol}. \quad (3)$$

Needed in the art are Nickel-based catalysts such as Nickel-based alloy catalysts with superior catalytic activity and stability for DRM.

SUMMARY OF THE INVENTION

According to one non-limiting aspect of the present disclosure, an example embodiment of a catalyst for converting carbon dioxide and methane to synthesis gas comprises an alumina-supported copper-nickel alloy composition having the formula $Ni_xCu_y$. The catalyst comprises about 70% to about 98% by weight of alumina in the catalyst, wherein x is an atomic percentage nickel content and y is an atomic percentage copper content, and wherein a ratio of x to y is about 3:1 to about 10:1. The introduction of a foreign transition metal into nickel-based catalysts helps to promote the stability as well as coking resistance of the catalyst. Without intending to be bound to any theory, it is believed that the reason for this is the modification of the electronic structure of the resulting catalytic systems. In one embodiment, the Ni—Cu catalyst composition according to the present disclosure is derived by state of the art electronic structure calculations based on Density Functional Theory (DFT).

According to another non-limiting aspect of the present disclosure, an example embodiment of a method for converting carbon dioxide and methane to synthesis gas includes processing a feedstock comprising methane and carbon dioxide stream in presence of a catalyst, whereby synthesis gas including carbon monoxide and hydrogen is produced. The catalyst comprises an alumina-supported copper-nickel alloy composition having the formula $Ni_xCu_y$. The catalyst comprises about 70% to about 98% by weight of alumina in the catalyst, wherein x is an atomic percentage nickel content and y is an atomic percentage copper content, and wherein a ratio of x to y is about 3:1 to about 10:1. In one embodiment, this process provides a stable conversion of methane and carbon dioxide with $H_2$/CO ratio close to 1 at a temperature of 650° C.

In an embodiment, the present disclosure relates to a process for the preparation of Bi-metallic Ni—Cu/$Al_2O_3$ catalyst comprising:

(a) Ni $(NO_3)_2 6H_2O$ and $Cu(NO_3)_2 2.5H_2O$ precursors with different atomic ratio such as 3:1, 8:1 and 10:1, were dissolved in 30 ml of Deionized water which is equal to the pore volume of support ($\gamma$-$Al_2O_3$) and then added to support by incipient wetness co-impregnation in order to obtain the desired Ni and Cu loading is 10 wt %.

(b) The impregnated support is then placed in a porcelain crucible and transferred to hot air oven for drying at 110° C./12 h in static air.

(c) Then the dried catalyst is subjected to calcination in ambient air at 600° C. for 5 h in a muffle furnace with a temperature ramp of 1° C./min. At this stage, all the organic materials have been burnt off from the surface, and all the hydroxides have been converted to their respective oxides.

In an embodiment, Ni salt used in step (a) is Nickel nitrate hexahydrate.

In an embodiment, Cu salt used in step (a) is Copper hemi (pentahydrate).

In an embodiment, support used in step (a) is $\gamma$-$Al_2O_3$.

In an embodiment, the atomic ratio of Ni and Cu is about the range of 3:1 to 10:1.

In an embodiment, the ratio of x to y is about 5:1 to about 9:1.

In an embodiment, the ratio of x to y is about 8:1 to about 10:1.

In an embodiment, the ratio of x to y is about 8:1.

In an embodiment, the catalyst comprises about 70% to 98% by weight of alumina in the catalyst.

In an embodiment, the catalyst comprises about 75% to 95% by weight of alumina in the catalyst.

In an embodiment, the catalyst comprises about 90% by weight of alumina in the catalyst.

In an embodiment, the ratio of x to y is about 8:1 to about 10:1, and the catalyst comprises about 75% to 95% by weight of alumina in the catalyst.

In an embodiment, the ratio of x to y is about 8:1, and the catalyst comprises about 90% by weight of alumina in the catalyst.

In an embodiment, the catalyst is prepared by a process comprising incipient wetness impregnation.

In an embodiment, the catalyst retains at least 99% of its optimized activity after at least 10 hours' catalysis reaction.

In an embodiment, the activity is either $CH_4$ conversion or $CO_2$ conversion.

In an embodiment, the catalyst retains about 100% of its initial activity after at least 10 hours' catalysis reaction.

In an embodiment, the activity is either $CH_4$ conversion or $CO_2$ conversion.

In an embodiment, the catalyst retains at least about 70% of its initial activity after at least 70 hours' catalysis reaction.

In an embodiment, the activity is either $CH_4$ conversion or $CO_2$ conversion.

In an embodiment, an XRD pattern of the catalyst has peaks at 2θ=44.4° and 51.7°.

In an embodiment, the present disclosure relates to a process for activation of methane using Ni—Cu/$Al_2O_3$ catalyst of claim 1-1.2 to obtain synthesis gas comprising passing $CH_4$:$CO_2$:He:Ar in the ratio ranging between 10:10:68:2 ratio in a reactor at atmospheric pressure in the presence of the Ni—Cu/$Al_2O_3$ catalyst at a temperature ranging between 600-750° C. for a period ranging between 1-70 hours at a 30 mL/min to obtain the synthesis gas.

In an embodiment, the present disclosure relates to a method for converting carbon dioxide and methane to synthesis gas, the method comprising: processing a feedstock comprising methane and carbon dioxide stream in presence of a catalyst, whereby synthesis gas including carbon monoxide and hydrogen is produced, wherein the catalyst comprises an alumina-supported copper-nickel alloy composition having the formula $Ni_xCu_y$, wherein the catalyst comprises about 70% to about 98% by weight of alumina in the catalyst, wherein x is an atomic percentage nickel content and y is an atomic percentage copper content, and wherein a ratio of x to y is about 3:1 to about 10:1.

In an embodiment, the method for processing the methane includes dry reforming of the methane.

In an embodiment, a mole ratio of the carbon monoxide to the hydrogen is about 1:1 at a temperature of about 650° C.

In an embodiment, a conversion percentage of methane is in the range of 1-80%.

In an embodiment, a conversion percentage of $CO_2$ is in the range of 1-90%.

In an embodiment, a conversion percentage of $CH_4$:$CO_2$:He:Ar steam is in the range of 1-90%.

In an embodiment, a $H_2$/CO ratio of the synthesis gas obtained is in the range of 1-1.2.

In an embodiment, the ratio of x to y is selected by using an ab-initio density functional theory calculation for an activation barrier of processing the methane.

In an embodiment, the ratio x to y is selected by using an ab-initio density functional theory calculation for each elementary reaction of dry reforming of the methane.

Additional features and advantages are described herein, and will be apparent from the following Detailed Description.

BRIEF DESCRIPTION OF THE DRAWINGS

FIG. 1 is a set of diagrams showing slab models of various copper coverage Cu/Ni models studied using DFT. FIG. 1(*i*) shows the top view and FIG. 1(*ii*) shows the side view of the same model system. FIG. 1(*a*) shows 1 ML Cu coverage system; FIG. 1(*b*) shows ⅓ ML Cu coverage system; and FIG. 1(*c*) shows ⅛ Cu coverage system. These systems are then compared to the pure Ni system shown in FIG. 1(*d*).

FIG. 8 is a set of graphs showing catalytic performance of the Cu/Ni catalyst (a) $CH_4$ and $CO_2$ conversions and (b) $H_2$/CO ratios versus TOS for $CO_2$ reforming of methane at 650° C. and $CH_4$/$CO_2$=1 over 10% (Ni:Cu-8:1)/$Al_2O_3$. Reaction conditions: Catalyst weight: 5.5 mg, diluent ($SiO_2$)

weight: 100 mg, $CH_4/CO_2/He/Ar$: 10/10/68/2, flow rate: 30 mL/min, reaction temperature: 650° C. at atmospheric pressure.

DETAILED DESCRIPTION OF THE INVENTION

Unless defined otherwise, all technical and scientific terms used herein have the same meaning as commonly understood by one of ordinary skill in the art to which this invention belongs. As used herein the following terms have the following meanings.

The term "comprising" or "comprises," as used herein, is intended to mean that the compositions and methods include the recited elements, but not excluding others.

The term "about," when used before a numerical designation, e.g., temperature, time, amount, and concentration, including range, indicates approximations which may vary by (+) or (−) 10%, 5% or 1%.

The term "support" refers to a material that carries an active catalytic material on its surface. In one embodiment of the present invention, the support comprises a high surface area alumina material having a bimetallic copper-nickel alloy immobilized on its surface in catalytically effective amounts.

The term "alumina" refers to any of the forms of aluminum oxide alone or as mixtures with themselves and/or small amounts of other metals and/or metal oxides. In one embodiment, alumina refers to $\gamma$-$Al_2O_3$.

The present disclosure, in part, is directed to a catalyst for converting methane and carbon dioxide to synthesis gas. Specifically, the present disclosure is directed to an alumina (i.e., $Al_2O_3$) supported bimetallic copper-nickel alloy catalyst with good stability and high catalytic activity and selectivity for reactions of converting methane and carbon dioxide to synthesis gas, such as DRM.

In one embodiment, the catalyst comprises an alumina (i.e., $Al_2O_3$) supported copper-nickel alloy composition having the formula $Ni_xCu_y$, wherein x is an atomic percentage nickel content and y is an atomic percentage copper content, and wherein a ratio of x to y is about 3:1 to about 10:1.

In certain non-limiting embodiments, the ratio of x to y is about 5:1 to about 10:1.

In certain non-limiting embodiments, the ratio of x to y is about 6:1 to about 10:1.

In certain non-limiting embodiments, the ratio of x to y is about 7:1 to about 10:1.

In certain non-limiting embodiments, the ratio of x to y is about 8:1 to about 10:1.

In some embodiments, the ratio of x to y is about 8:1.

Depending on the usage requirements or preferences for the particular catalyst, a slightly higher amount of copper dopant may result in a complete loss of DRM activity of the catalyst, whereas low amounts of dopant may fail to improve the stability of the catalyst.

According to certain non-limiting embodiments, the catalyst comprises about 75% to about 95% by weight of alumina in the catalyst.

In some embodiments, the catalyst may comprise at least about 75%, at least about 80%, at least about 85%, or at least about 90% by weight of alumina in the catalyst.

In further embodiments, the catalyst may comprise no greater than about 95%, no greater than about 90%, no greater than about 85%, or no greater than about 80% by weight of alumina in the catalyst.

As such, the catalyst may comprise about 80% to about 95%, about 85% to about 95%, or about 90% by weight of alumina in the catalyst.

In one embodiment, an XRD pattern of the catalyst comprising an alumina-supported copper-nickel alloy composition before $H_2$ reduction has broad peaks at 2θ=37.4, 64.3 and 75.3.

In one embodiment, an XRD pattern of the catalyst after $H_2$ reduction has peaks at 2θ=44.4° and 51.7°.

In one embodiment, the catalyst comprising an alumina-supported copper-nickel alloy composition shows both an excellent catalysis activity and a long-term stability.

In one embodiment, the catalyst can retain at least about 99% of its optimized activity after at least 10 hours' catalysis reaction.

In one embodiment, the catalyst can retain at least about 99% of its optimized activity after at least 10 hours' catalysis reaction during either $CH_4$ conversion or $CO_2$ conversion.

In one embodiment, the catalyst can retain about 100% of its optimized activity after at least 10 hours' catalysis reaction.

In one embodiment, the catalyst can retain about 100% of its optimized activity after at least 10 hours' catalysis reaction during either $CH_4$ conversion or $CO_2$ conversion.

Figures 6, 6A, 6C:
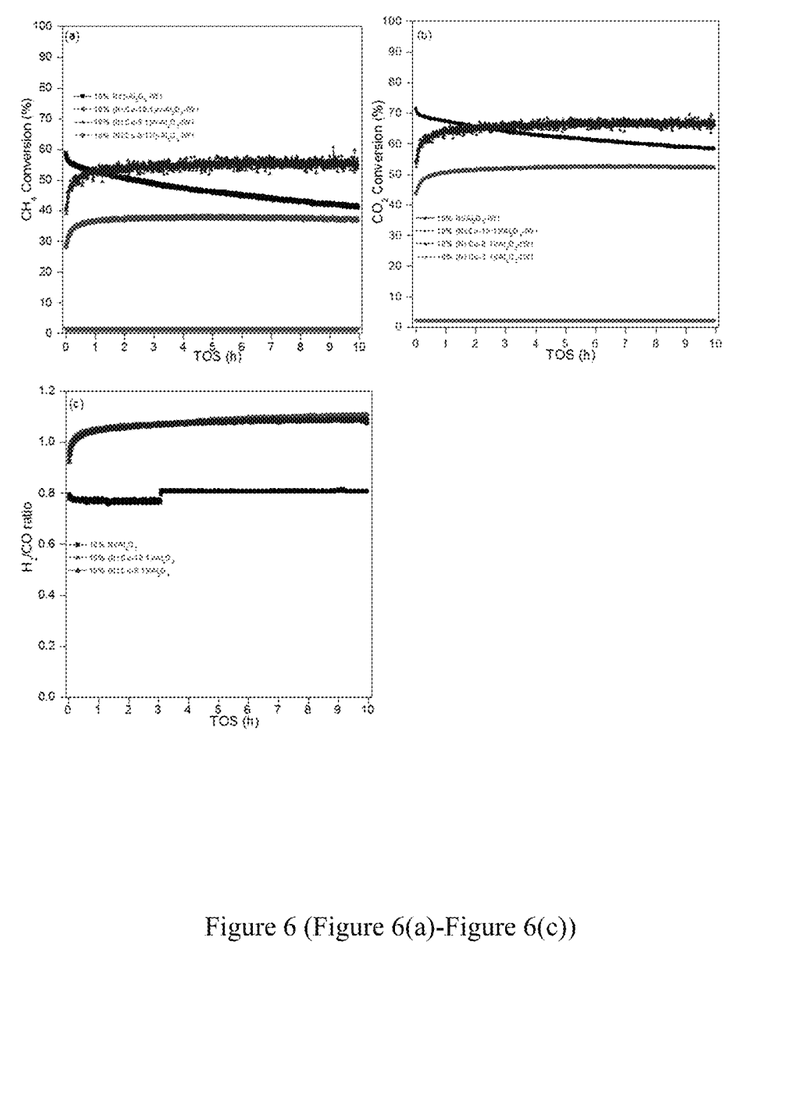
FIG. 6 is a set of graphs showing catalytic performance of Cu/Ni catalyst (a) $CH_4$ conversions, (b) $CO_2$ conversions and (c) $H_2$/CO ratios versus TOS for $CO_2$ reforming of methane at 650° C. and $CH_4$/$CO_2$=1. Reaction conditions: Catalyst weight: 5.5 mg, diluent ($SiO_2$) weight: 100 mg, $CH_4$/$CO_2$=1, flow rate: 30 mL/min, at atmospheric pressure.

FIG. 6(a) and FIG. 6(b) showed that both the 10% (Ni:Cu-8:1)/$\gamma$-$Al_2O_3$ catalyst and the 10% (Ni:Cu-10:1)/$\gamma$-$Al_2O_3$ catalyst retained at least 99% and about 100% of its optimized catalysis activity.

In one embodiment, the catalyst comprising an alumina-supported copper-nickel alloy composition can significantly improve the $H_2$/CO ratio as compared with the corresponding mono metallic catalyst.

In one embodiment, the catalyst comprising an alumina-supported copper-nickel alloy composition can significantly improve the $H_2$/CO ratio to at least about 1.0, at least about 1.1, at least about 1.2, at least about 1.3, at least about 1.4 or at least about 1.45 after 10 hours' reaction.

FIG. 6(c) showed that both the 10% (Ni:Cu-8:1)/$\gamma$-$Al_2O_3$ catalyst and the 10% (Ni:Cu-10:1)/$\gamma$-$Al_2O_3$ catalyst can improve the $H_2$/CO ratio to at least about 1.2, at least about 1.3, or at least about 1.45 after 10 hours' reaction. FIG. 6(c) showed that the $H_2$/CO ratio for the 10% Ni/$\gamma$-$Al_2O_3$ catalyst was about 0.8 after 10 hours' reaction.

In one embodiment, the catalyst comprising an alumina-supported copper-nickel alloy composition can also have a much better long-term stability as compared with the corresponding mono metallic catalyst.

In one embodiment, the catalyst comprising an alumina-supported copper-nickel alloy composition can retain at least 70% of its initial activity after at least about 40 hours, at least about 50 hours, at least about 60 hours, or at least about 70 hours' catalysis reaction.

In one embodiment, the catalyst comprising an alumina-supported copper-nickel alloy composition can retain at least 70% of its initial activity after at least about 40 hours, at least about 50 hours, at least about 60 hours, or at least about 70 hours' catalysis reaction during either $CH_4$ conversion or $CO_2$ conversion.

Figures 7, 7A, 7B:
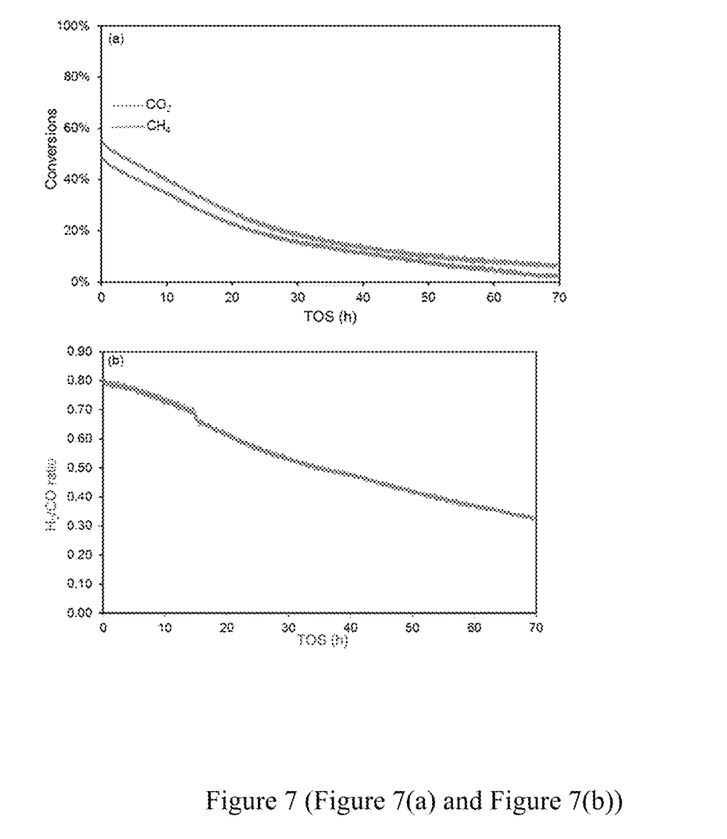
FIG. 7 is a set of graphs showing catalytic performance of different catalysts (a) $CH_4$ and $CO_2$ conversions and (b) $H_2$/CO ratios versus TOS for $CO_2$ reforming of methane at 650° C. and $CH_4$/$CO_2$=1 over 10% Ni/$Al_2O_3$. Reaction conditions: Catalyst weight: 5.5 mg, diluent ($SiO_2$) weight: 100 mg, $CH_4$/$CO_2$/He/Ar: 10/10/68/2, flow rate: 30 mL/min, reaction temperature: 650° C. at atmospheric pressure.

For example, FIG. 7(a) and FIG. 7(b) showed that the 10% Ni/$\gamma$-$Al_2O_3$ catalyst lost about 99% of its catalytic reactivity after 70 hours during either $CH_4$ conversion or $CO_2$ conversion.

Figures 8, 8A, 8B:
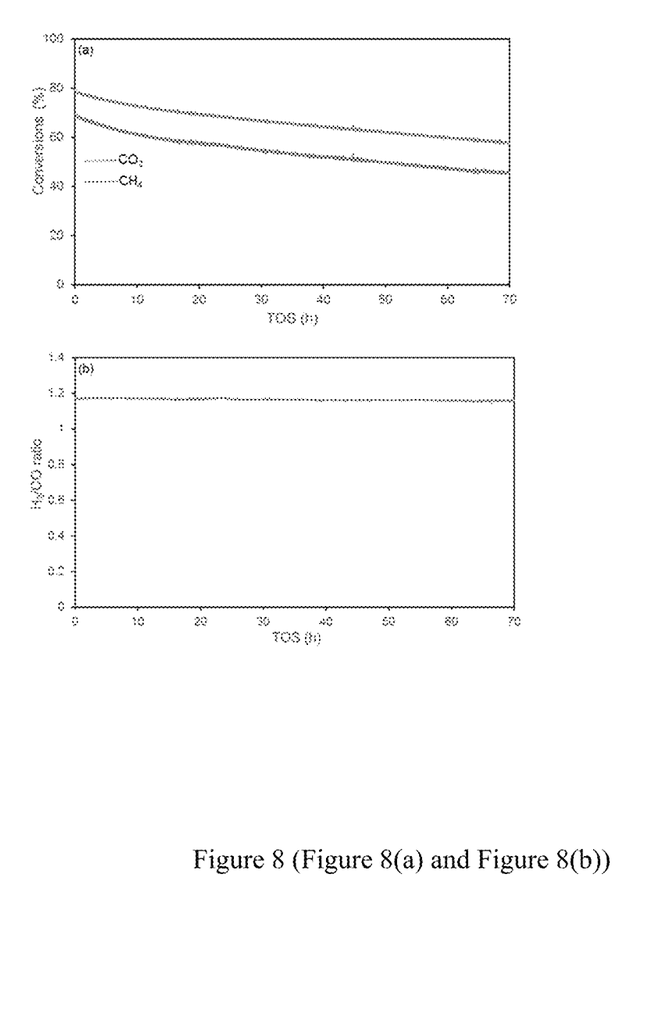

As a comparison, FIG. 8(a) showed that the 10% (Ni:Cu-8:1)/$\gamma$-$Al_2O_3$ catalyst retained at least about 70% of the initial activity during either $CH_4$ conversion or $CO_2$ conversion.

FIG. 8(b) showed that the 10% (Ni:Cu-8:1)/γ-Al$_2$O$_3$ catalyst maintained the H$_2$/CO ratio at about 1.2 for at least 70 hours, thus demonstrating an excellent long-term stability.

The following are non-limiting examples of catalyst materials and methods for converting carbon dioxide and methane to synthesis gas according to the present disclosure. Persons having ordinary skill in the art will appreciate that variations of the following examples are possible within the scope of the invention, which is defined solely by the claims.

Initially slab models were developed using the (111) facet of pure nickel. This slab model was then modified by replacing the surface nickel atoms with copper atoms. Three different Cu—Ni slab models were developed with varying amounts of copper dopant: (a) high coverage Cu—Ni (with 1 ML of Cu on Ni), (b) medium coverage of Cu—Ni (with ⅓ ML of Cu on Ni), and (c) low coverage Cu—Ni (⅑ ML coverage of Cu on Ni). Density functional theory (DFT) calculations were then used to calculate the activation barriers for each elementary reaction of DRM mechanism. The DFT calculations clearly established that lower and medium copper loaded Ni/Al$_2$O$_3$ catalysts are very stable regarding coke resistance and metal sintering.

Experimental results were compared with the ab-initio DFT calculations. A series of Ni—Cu/Al$_2$O$_3$ bi-metallic catalysts with constant metal loading (10 wt %) and three different Ni:Cu atomic ratios (3:1, 8:1, and 10:1) was prepared by Incipient Wetness Impregnation method and examined for DRM at 650° C. Compared with monometallic Ni catalyst, the introduction of Cu enhances catalyst stability and decreases the deactivation rate over 10 hours on stream. Monometallic 10% Ni/Al$_2$O$_3$ catalyst initially showed high CH$_4$ (59%) and CO$_2$ (71%) conversions, while after 10 h, the activity declined to CH$_4$ (41%) and CO$_2$ (58%) following a gradual deactivation trend as expected. In the case of bimetallic Ni—Cu catalysts; however, the 8:1 Ni:Cu catalyst displayed the most stability maintaining a constant 55% CH$_4$ conversion, while the lowest Cu loaded catalyst (10:1 Ni:Cu) maintained a lower, yet constant 36% CH$_4$ conversion over 10 hours of DRM. Along with the lack of any apparent deactivation during 10 hours TOS, the bimetallic catalysts exhibited much better H$_2$/CO ratios than the monometallic catalyst. In case of higher Ni:Cu(3:1) atomic ratio catalyst, almost no conversion was observed, which might be due to the Cu enriched surface of the bimetallic catalyst, which reduces the availability of exposed active Ni sites.

The present inventors have surprisingly discovered that there is a suitable range of Cu loading that provides a stable conversion of methane and carbon dioxide with H$_2$/CO ratio close to 1 at a temperature of 650° C. Without intending to be bound to any theory, it is believed that one plausible reason for the sustained activity of the catalyst according to the present disclosure is the formation of Ni—Cu alloy, which restricts migration of Ni particles as well as retards coke formation. This is evident from the characterization of the fresh and spent catalysts by XRD and H$_2$-temperature-programmed reduction (TPR). These investigations also showed that the decoration of active Ni clusters with a suitable amount of Cu has a favorable effect on Ni dispersion, catalyst reducibility and aids in the formation of highly active Ni-enriched Ni—Cu alloy sites. Specifically, TPR results revealed that the introduction of the promoter metal decreases the reduction temperature of the monometallic catalyst. An easier reduction of copper oxide over nickel is also observed. Reduced sample XRD results showed that the addition of Cu into Ni changes the crystal structure of metallic Ni, forming the Ni—Cu alloy. The experimental results were compared with ab-initio DFT calculations; the experimental results corroborated the ab-initio DFT calculations performed on the Cu/Ni bimetallic catalysts according to the present disclosure.

The following sections provide examples of optimization approaches from which a non-limiting example of catalysts for converting carbon dioxide and methane to synthesis gas according to the present disclosure can be made. Although specific approaches are given in the sections below, the approaches provided herein do not encompass all possible options. Rather, the present inventors determined that the approaches given in the sections below represent possible approaches that can produce a suitable embodiment of catalysts for converting carbon dioxide and methane to synthesis gas. It is to be understood that the catalysts for converting carbon dioxide and methane to synthesis gas of the present disclosure may be made according to other approaches.

Methodology

Modeling

All the calculations reported in this work were performed using the VASP code. The wave functions at each k-point are expanded with a plane-wave basis set with a kinetic energy cut-off of 400 eV. Blöchl's all-electron-like projector augmented wave (PAW) method was used to treat the interactions between the ion cores and the valence electrons. The generalized gradient approximation (GGA) functional with the revised form of Perdew-Burke-Ernzerhoff (RPBE) as revised by Hammer et al was used to describe the exchange-correlation. The RPBE functional has been observed to be more accurate than the other functionals such as PW91 or PBE in calculating heats of adsorption on nickel for molecules relevant in the reforming reactions. Brillouin zone sampling of the surface slabs was performed using a 3×3×1 grid generated via the Monkhorst-Pack scheme. The Methfessel-Paxton smearing method of first order is employed to determine the electron occupancies with a smearing parameter a of 0.2 eV. The presence of a magnetic element (Ni) in the systems studied in this work warrants the inclusion of the spin polarization effects in these calculations, which are properly addressed in this work. Earlier DFT works on Ni have demonstrated the necessity to account for surface magnetism for an accurate quantitative description of the total energies. The convergence criteria for the electronic degrees of freedom is set such that the electronic motion is considered converged when the energy differences in the consecutive steps are less than $10^{-4}$ eV for a normal geometry optimization calculation, whereas for transition state calculation this is set as $10^{-6}$ eV. The convergence of forces is assumed to be achieved when the forces acting on atoms is less than 0.01 eV/A in all the calculations. Dimer method has been employed to obtain the geometries of transition states. The transition state structures are assumed to be converged if the forces acting on the atoms are all less than 0.01 eV/A for the various degrees of freedom set in the calculation.

The adsorption energy, $E_{ads}$, is calculated by $$E_{ads} = E_{(adsorbate/slab)} - E_{slab} - E_{adsorbate}$$

where $E_{adsorbate/slab}$ is the total energy of the slab model with adsorbate; $E_{slab}$ is the total energy of the bare slab model; $E_{adsorbate}$ is the total energy of the isolated adsorbate obtained by putting it in a 20×20.5×21 Å box. According to this definition of adsorption energy, a negative value of adsorption energy implies exothermic adsorption. The more negative value of adsorption energies, the more strongly is the chemisorption of the adsorbates on the surface.

Figures 1, 1A, 1D, 1I:
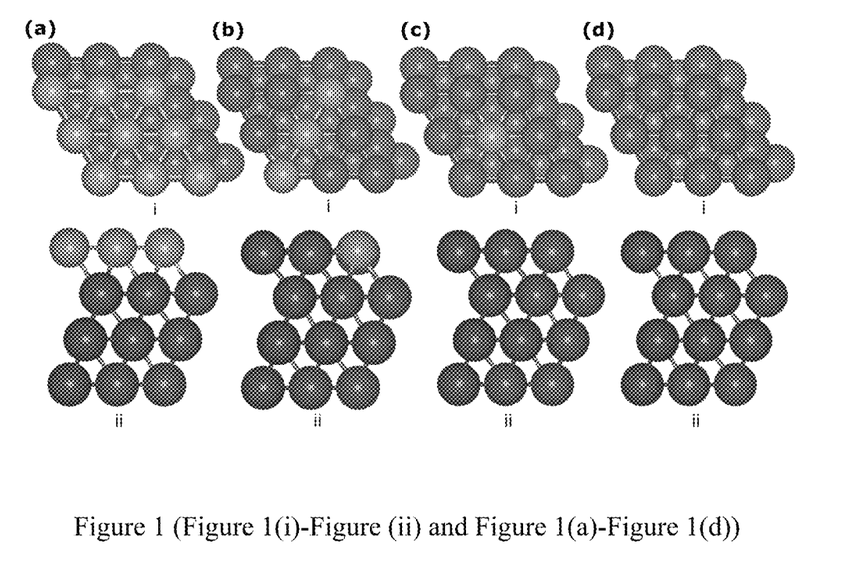

Nickel crystallizes in a face centered cubic (fcc) crystal lattice. In this study we have chosen the (111) orientation of this lattice due to its abundance in nickel-based alloys. A four layer slab with a p(3×3) supercell repetition is used to model a Ni (111) surface. To avoid the interactions between the neighboring unit cells, the two z-direction neighbors are separated by a vacuum of 7 layers which comes to around 14.25 Å. The Cu/Ni(111) surface alloy was then constructed by replacing one nickel atom in the topmost layer of Ni(111) by copper atoms (i.e., at the dopant coverage of ⅑ ML). The slab models are shown in FIG. 1. Unless otherwise specified, the bottom most layer in the slab models were constrained at their bulk position and the top three layers as well as the adsorbates were allowed to relax during geometry optimization and transition state (TS) search.

The optimized lattice constant was calculated as 3.526 Å in excellent agreement with the experimental value of 3.524 Å. For the isolated molecular structures, the calculated C—H bond lengths in $CH_4$ is 1.10 Å. The C—O bond lengths in $CO_2$ molecule were calculated as 1.18 Å with a completely linear molecule with $\angle OCO$ as 180°. Again, these numbers (for both methane and carbon dioxide) are in close agreement with 1.08 Å, 1.16 Å and $\angle 180°$ respectively.

FIG. 1 shows slab models of various copper coverage Cu/Ni models studied using DFT. FIG. 1(i) shows the top view and FIG. 1(ii) shows the side view of the same model system. FIG. 1(a) shows 1 ML Cu coverage system; FIG. 1(b) shows ⅓ ML Cu coverage system; and FIG. 1(c) shows ⅑ Cu coverage system. These systems are then compared to the pure Ni system shown in FIG. 1(d).

Experimental

Materials and Catalyst Synthesis

In this work, nickel nitrate hexahydrate (Ni $(NO_3)_2 6H_2O$, Sigma Aldrich) and copper nitrate hemi (pentahydrate) ($Cu(NO_3)_2 2.5H_2O$, ACROS) were used as nickel and copper precursors, respectively. γ-$Al_2O_3$(Sasol) powder was used as support. All reagents were used without further purification. 10% $CH_4$/10% $CO_2$/68% He/2% Ar (feed gas), and hydrogen (reducing gas) were purchased from National Industrial Gas Plants, Qatar.

10 wt % Ni/γ-$Al_2O_3$ Synthesis:

9.917 g Ni $(NO_3)_2 6H_2O$ precursor was dissolved in 30 ml of Deionized water which is equal to the pore volume of support (γ-$Al_2O_3$) and then added to 20 g support by incipient wetness impregnation to obtain the desired Ni loading (10 wt % Ni). The impregnated support is then placed in a porcelain crucible and transferred to hot air oven for drying at 110° C. for 12 h in static air. Then the dried catalyst is subjected to calcination in ambient air at 600° C. for 5 h in a muffle furnace with a temperature ramp of 1° C./min. At this stage, all the organic materials have been burnt off from the surface, and all the hydroxides have been converted to their respective oxides.

10 wt % (Ni:Cu-3:1 Atomic Ratio)/γ-$Al_2O_3$Synthesis:

7.78 g Ni $(NO_3)_2 6H_2O$ and 1.942 g $Cu(NO_3)_2$ $2.5H_2O$ precursors were dissolved in 30 ml of Deionized water which is equal to the pore volume of support (γ-$Al_2O_3$) and then added to support (γ-$Al_2O_3$) (18 g) by incipient wetness co-impregnation in order to obtain the desired Ni and Cu loadings (10 wt % Ni and Cu). The impregnated support is then placed in a porcelain crucible and transferred to hot air oven for drying at 100° C. for 12 h in static air. Then the dried catalyst is subjected to calcination in ambient air at 600° C. for 5 h in a muffle furnace with a temperature ramp of 1° C./min. At this stage, all the organic materials have been burnt off from the surface, and all the hydroxides have been converted to their respective oxides.

10 wt % (Ni:Cu-8:1 Atomic Ratio)/γ-$Al_2O_3$Synthesis:

8.732 g Ni $(NO_3)_2 6H_2O$ and 0.874 g $Cu(NO_3)_2 2.5H_2O$ precursors were dissolved in 30 ml of Deionized water which is equal to the pore volume of support (γ-$Al_2O_3$) and then added to support (17.99 g) by incipient wetness co-impregnation in order to obtain the desired Ni and Cu loadings (10 wt % (Ni and Cu). The impregnated support is then placed in a porcelain crucible and transferred to hot air oven for drying at 100° C. for 12 h in static air. Then the dried catalyst is subjected to calcination in ambient air at 600° C. for 5 h in a muffle furnace with a temperature ramp of 1° C./min. At this stage, all the organic materials have been burnt off from the surface, and all the hydroxides have been converted to their respective oxides.

10 wt % (Ni:Cu-10:1 Atomic Ratio)/γ-$Al_2O_3$Synthesis:

8.943 g Ni $(NO_3)_2 6H_2O$ and 0.714 g $Cu(NO_3)_2 2.5H_2O$ precursors were dissolved in 30 ml of Deionized water which is equal to the pore volume of support (γ-$Al_2O_3$) and then added to support (18 g) by incipient wetness co-impregnation in order to obtain the desired Ni and Cu loadings (10 wt % (Ni and Cu). The impregnated support is then placed in a porcelain crucible and transferred to hot air oven for drying at 100° C. for 12 h in static air. Then the dried catalyst is subjected to calcination in ambient air at 600° C. for 5 h in a muffle furnace with a temperature ramp of 1° C./min. At this stage, all the organic materials have been burnt off from the surface, and all the hydroxides have been converted to their respective oxides.

Catalytic Activity Performance:

$CO_2$ reforming of methane was conducted in a U-tube shape quartz-tube reactor (I.D. 6 mm) at atmospheric pressure. For tests of catalytic activity and stability, the reaction was carried out at 650° C. for 10 h over 5.5 mg of catalyst and diluent ($SiO_2$) 100 mg. Before reaction, the catalyst was in situ reduced with pure $H_2$ (50 mL $min^{-1}$) at 700° C. for 1 h. Subsequently, the catalyst was cooled down to a targeted reaction temperature in Helium flow before the introduction of feed gas to start the reaction. The composition of reactant gas was (10% $CH_4$:10% $CO_2$: 68% He: 2% Ar) and the total flow rate was 30 mL $min^{-1}$. The effluent gas was online analyzed by Hidden Mass spectrometry.

Results and Discussion

Density Functional Theory Calculations

As was mentioned in the methodology section, extensive slab models based DFT calculations were performed. Three different slab models were constructed as discussed above. These slab models are shown in FIG. 1.

The adsorption energies of all the DRM intermediates on these surfaces with varying amounts of copper are studied as a first step. Adsorption energies of the intermediates on a particular catalytic surface properly quantifies the affinity of this intermediate towards this particular surface. For instance, the adsorption energies of carbon on a particular surface is a measure for the coking tendency of the surface. Table 1 lists the adsorption energies of carbon on various surfaces. According to the definition used for calculating the adsorption energies, a more negative adsorption energy implies a stronger adsorption of the intermediate to the surface. Therefore, stronger adsorption of carbon implies the higher tendency of the surface for coke deposition.

TABLE 1

Adsorption Energies of carbon atom on surfaces with varying amounts of copper

| Surface | Adsorption energies |
|---|---|
| Monometallic Ni(111) | −7.50 eV |
| 1/9 ML Cu Ni/Cu(111) | −6.98 eV |
| 1/3 ML Cu Ni/Cu(111) | −6.33 eV |
| 1 ML Cu Ni/Cu(111) | −5.62 eV |

As can be seen from the table above, carbon adsorbs most strongly on monometallic (pure) Ni (111) surface. Thus it can be said that pure Ni surface has the highest tendency for coking. Applicants observe that as the amount of copper dopant amount increases, the carbon adsorption energies (in other words, the coking tendency of a particular surface) decreases. Thus, as far as the coking affinity of the surface is concerned, Applicants observe that the surface with 1.0 ML copper coverage has the least tendency for coking among all surfaces studied.

Figure 2:
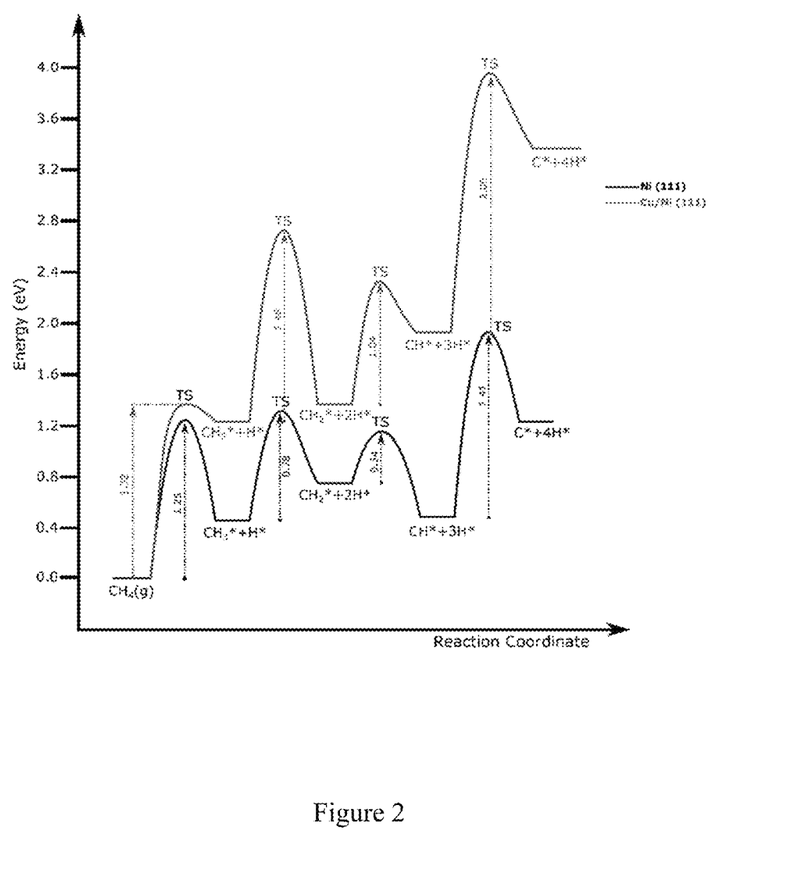
FIG. 2 is a graph showing reaction energy profile for methane dissociation for pure Ni compared to high loading Cu/Ni bimetallic system.

FIG. 2 shows a reaction energy profile for methane dissociation for pure Ni compared to high loading Cu/Ni bimetallic system.

FIG. 2 specifically shows the reaction energy profile for the dehydrogenation steps on pure nickel surface compared to the high Cu loading (1.0 ML) system. As can be seen from FIG. 2, the reaction energy barriers for the dehydrogenation steps are prohibitively high for the DRM reaction to sustainably proceed for any considerable periods of time. Thus, while Table 1 shows that high Cu loading catalyst may be better in terms of resisting carbon formation but the elementary step activation barriers for this system shown in FIG. 2 are so high that it is rather difficult for the reaction to proceed.

Figures 3, 3A, 3B:
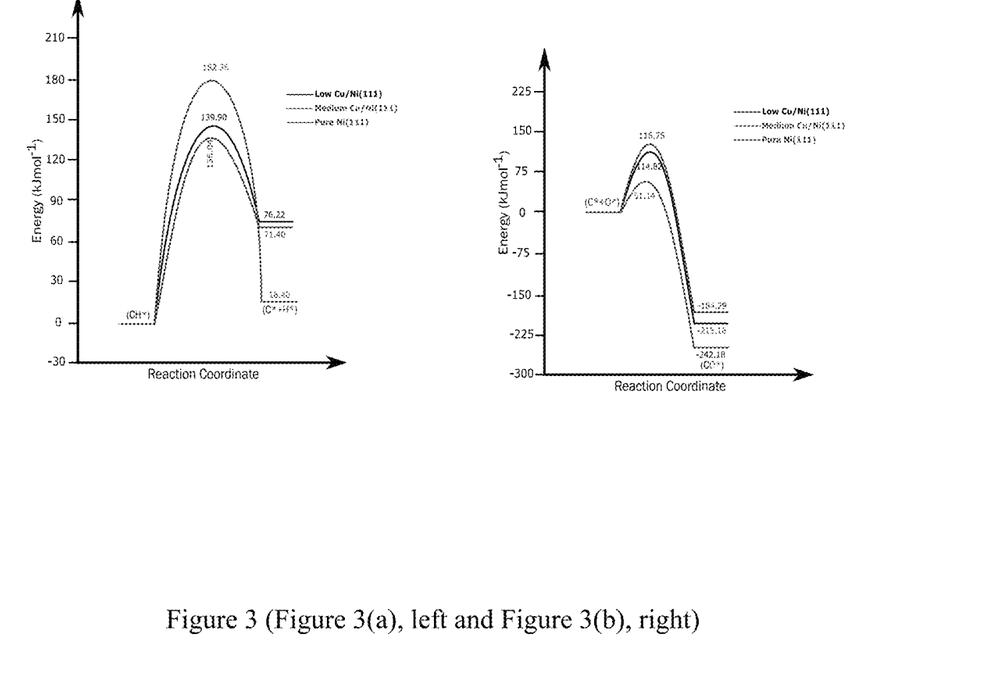
FIG. 3 is a set of graphs showing activation barriers of (a) C formation via the CH dissociation pathway and (b) C elimination by oxidation with O to form CO.

FIG. 3 shows activation barriers of FIG. 3(a) C formation via the CH dissociation pathway and FIG. 3(b) C elimination by oxidation with O to form CO.

The activation barriers for carbon formation reaction through CH dissociation CH*→C*+H* are shown in the plot FIG. 3(a) and carbon elimination via oxidation with oxygen to form CO, C*+O*→CO* is shown in the plot FIG. 3(b). From the first figure, the activation barrier for CH* dissociation reaction is of the order of 136 and 139 kJ/mol for the pure Nickel system and low Cu coverage system. For the same reaction, the barrier for carbon formation on the surface through this reaction is increased to an order of 182 kJ/mol, an increase in the barrier by almost 50 kJ/mol, for systems with medium coverage of Cu in Cu—Ni system. Thus the DFT calculations of Cu—Ni slab models predict that the barrier for carbon formation on medium coverage Cu—Ni is considerably increased making it comparatively difficult for the carbon deposition to take place on this system.

The second plot shows the barriers for carbon elimination from the surface by oxidation with oxygen to form CO. From this figure, it can be clearly observed that carbon elimination barrier is considerably decreased to 51 kJmol$^{-1}$ for medium Cu doped system when compared to low Cu doped system and pure Ni system. This clearly shows that the removal of C from the surface has become much facile on this system.

Experimental $H_2$—Temperature Programed Reduction

Figures 4, 4A, 4D:
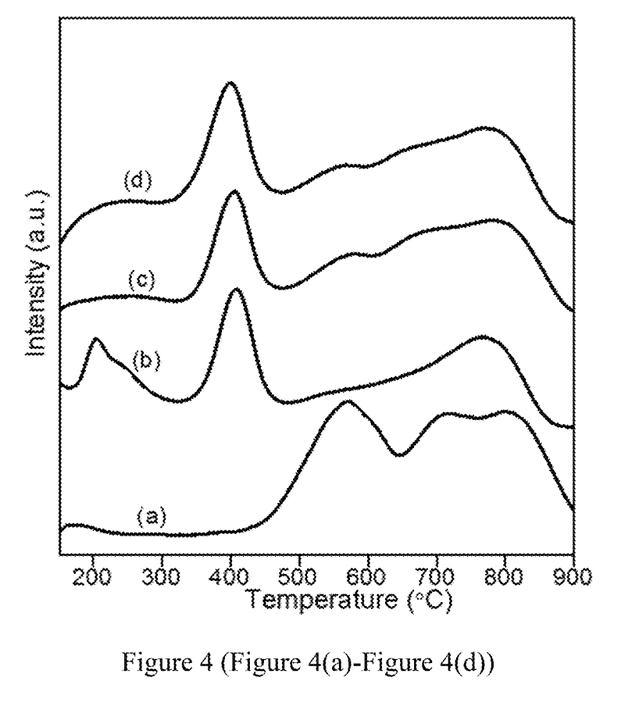
FIG. 4 is a graph showing TPR analysis of (a) 10% Ni/$\gamma$-$Al_2O_3$, (b) 10% (Ni:Cu-3:1)/$\gamma$-$Al_2O_3$, (c) 10% (Ni:Cu-8:1)/$\gamma$-$Al_2O_3$ and (d) 10% (Ni:Cu-10:1)/$\gamma$-$Al_2O_3$ samples.

FIG. 4 shows TPR profile of fresh calcined monometallic Ni and Ni—Cu bi-metallic catalysts supported on $Al_2O_3$. The monometallic 10% Ni/γ-$Al_2O_3$ showed broad multiple reduction peaks. This could be due to the presence of different kind of NiOx species, resulting strong interaction of NiO with γ-$Al_2O_3$. Furthermore, the different reduction temperatures might be partially due to a different size of NiO particles. In general, for the Ni-based catalysts, the low temperature peaks are attributed to the reduction of the bulk NiO particles which are weakly interacting with the support, while the high temperature peaks are related to the reduction of NiO species strongly interacted with the $Al_2O_3$ and/or attributed to the spinel $NiAl_2O_4$.

In contrast, in the Cu modified catalysts, at higher Cu loading 10% (Ni:Cu-3:1)/$Al_2O_3$ catalysts displayed different reduction behavior from their counterparts. Reduction peaks between them clearly suggest the synergy between NiO and CuO oxides. The $H_2$ consumption peak corresponding to NiO shifted to a lower temperature from 560 to 400 C. At higher Cu loading i.e. 10% (Ni:Cu-3:1 atomic ratio)/$Al_2O_3$, (FIG. 4(b)) show three distinct peaks, at low temperature 180-230° C. can be assigned to the reduction of segregated $Cu_2O$, the peaks located at below 500° C. can be assigned to reduction of NiO oxides which is strongly interacted with CuO and the reduction peak above 730° C. can be assigned to the reduction of $NiAl_2O_4$. Whereas, 10% (Ni:Cu-8:1 atomic ratio)/$Al_2O_3$ and 10% (Ni:Cu-10:1 atomic ratio)/$Al_2O_3$ (FIG. 4(c) and FIG. 4(d)) show two reduction peaks. Low temperature peak at 400° C., which could be due to the incorporation of $Ni^{2+}$ into the CuO framework results in a slight narrowing of the lattice owing to the smaller radius of $Ni^{2+}$ than that of $Cu^{2+}$. This can be explained by following possible reasons; (1) the positive influence of CuO addition on the NiO dispersion by the dilution effect and/or (2) the synergistic effect between Ni and Cu. The reduction temperature of NiO greatly reduces (<500 C) in presence of Cu and the reduction of NiO was more likely catalyzed by metallic copper. In general, the reduction temperature of bulk CuO (230° C.) is substantially lower than bulk NiO (430° C.). This suggests that CuO was reduced more readily than NiO, in agreement with thermodynamics. This finding was vital when the TPR results for copper- and aluminum-doped nickel catalysts were interpreted.

FIG. 4 shows a TPR analysis of FIG. 4(a) 10% Ni/γ-$Al_2O_3$, FIG. 4(b) 10% (Ni:Cu-3:1)/γ-$Al_2O_3$, FIG. 4(c) 10% (Ni:Cu-8:1)/γ-$Al_2O_3$ and FIG. 4(d) 10% (Ni:Cu-10:1)/γ-$Al_2O_3$ samples.

XRD Analysis of Fresh Calcined and Reduced Catalyst Samples

Figure 5:
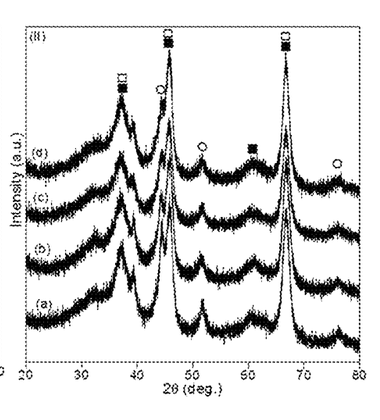
FIG. 5 is a set of graphs showing XRD patterns of (I) calcined and (II) reduced: (a) 10% Ni/$\gamma$-$Al_2O_3$, (b) 10% (Ni:Cu-3:1)/$\gamma$-$Al_2O_3$, (c) 10% (Ni:Cu-8:1)/$\gamma$-$Al_2O_3$ and (d) 10% (Ni:Cu-10:1)/$\gamma$-$Al_2O_3$ catalysts samples. (■: $\gamma$-$Al_2O_3$, ●: NiO, ○: $Ni^0$, ▫: $NiAl_2O_4$)
Figure 5I:
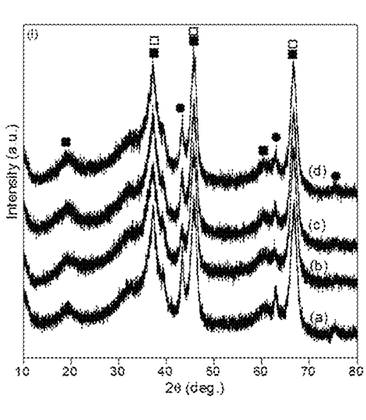

FIG. 5(I) shows XRD patterns for the fresh calcined samples. The XRD pattern of mono metallic Ni/γ-$Al_2O_3$ shows peaks at 2θ=37.2°, 45.5°, 60.2° and 66.6° which can be attributed to a mixture of $NiAl_2O_4$ and γ-$Al_2O_3$. The peaks at 2θ=43.3°, 66.9° and 75.4° are attributed to the crystalline structure of NiO. The XRD analysis of Cu-modified bimetallic catalysts show that the intensity peaks of $Al_2O_3$ were found on the same range. Moreover, broader NiO peaks were also observed at 2θ=37.4, 64.3 and 75.3. The reason behind this observation is that CuO and NiO share the same plane and form $Ni_xCu_{(1-x)}O$ mixed binary oxides. This metal oxide later converted into alloy by $H_2$ reduction playing a key role in optimizing the performance as well as the stability of the catalyst. The impregnation of Cu on Ni-based catalyst changed the physiochemical properties of the catalyst quite drastically as mixed oxides as $Ni_xCu_{(1-x)}O$ having identical peaks to that of NiO were shown by XRD. FIG. 5(II) shows XRD patterns of reduced Ni and Ni—Cu supported on $Al_2O_3$, both monometallic and bi-metallic catalysts display peaks at $2\theta=44.4°$ and $51.7°$ are attributed to metallic Ni along with $Al_2O_3$ and $NiAl_2O_4$ phases. The XRD pattern of $Ni/Al_2O_3$ and Ni—$Cu/Al_2O_3$ supports the assignment of the peak at 780° C. in TPR to the reduction of $NiAl_2O_4$.

FIG. 5 shows XRD patterns of FIG. 5(I) calcined and FIG. 5(II) reduced: (a) 10% Ni/γ-$Al_2O_3$, (b) 10% (Ni:Cu-3:1)/γ-$Al_2O_3$, (c) 10% (Ni:Cu-8:1)/γ-$Al_2O_3$ and (d) 10% (Ni:Cu-10:1)/γ-$Al_2O_3$ catalysts samples. (■: γ-$Al_2O_3$, ●: NiO, ○: $Ni^0$, □: $NiAl_2O_4$).

Catalytic Performance Study in Dry Reforming of Methane $CO_2$ reforming of methane experiments were tested to study the activity of different catalysts, the effect of Cu loading at 650° C. temperature. In this study, all DRM reactions were performed at atmospheric pressure with 5.5 mg catalyst, 100 mg ($SiO_2$), a feed gas flow rate 30 mL/min.

(i)Effect of Cu loading on Ni/γ-$Al_2O_3$

Different monometallic and bi-metallic catalysts were comparatively studied at 650° C. The $CH_4$ conversion, $CO_2$ conversion, and $H_2$/CO ratio are presented in FIG. 6(a)-FIG. 6(c). Monometallic 10% Ni/$Al_2O_3$ catalyst initially showed high $CH_4$ (59%) and $CO_2$ (71%) conversions, while after 10 h, the activity declined to $CH_4$ (41%) and $CO_2$ (58%) following a gradual deactivation trend as expected. It is expected that the large Ni particles are present in this poorly structured catalyst, which sintered during TOS. When the reaction proceeds, the sintered Ni particles will also deactivate more severely by carbon formation. While compared with mono-metallic Ni catalyst, the introduction of Cu enhances catalyst stability and decreases the deactivation rate over 10 h time on stream. Among the bi-metallic catalysts, the medium Cu loaded 10% (Ni:Cu-8:1)/γ-$Al_2O_3$ catalyst displayed the most stability maintaining a constant 55% $CH_4$ conversion, while the lowest Cu loaded 10% (Ni:Cu-10:1)/γ-$Al_2O_3$ catalyst maintained a lower, yet, constant 36% $CH_4$ conversion over 10 hours of DRM. Along with the lack of any apparent deactivation during 10 hours TOS, the bimetallic catalysts exhibited much better $H_2$/CO ratios than the monometallic catalyst. In case of higher Cu loaded 10% (Ni:Cu-3:1)/γ-$Al_2O_3$ catalyst, almost no conversion was observed. A slightly higher amount of copper dopant kills the catalyst with a complete loss of DRM activity, whereas low amounts of dopant fail to improve the stability of the catalyst. Without intending to be bound to any theory, it is believed that the low conversion is due to the Cu enriched surface of the bimetallic catalyst, which reduces the availability of exposed active Ni sites. It has been observed both theoretically as well as experimentally that there is an optimum amount of copper dopant which can be introduced in the catalyst.

FIG. 6 shows catalytic performance of the catalysts for FIG. 6(a) $CH_4$ conversions, FIG. 6(b) $CO_2$ conversions and FIG. 6(c) $H_2$/CO ratios versus TOS for $CO_2$ reforming of methane at 650° C. and $CH_4$/$CO_2$=1. Reaction conditions: Catalyst weight: 5.5 mg, diluent ($SiO_2$) weight: 100 mg, $CH_4$/$CO_2$=1, flow rate: 30 mL/min, at atmospheric pressure.

(ii) Catalyst Stability Test

In order to investigate the long-term stability of the catalysts for DRM, the $CH_4$—$CO_2$ reforming was performed with feed gas 30 mL/min, 5.5 mg catalyst and 100 mg diluent ($SiO_2$) at 650° C. on monometallic Ni/γ-$Al_2O_3$ and bi-metallic 10% (Ni:Cu-8:1)/γ-$Al_2O_3$. FIG. 7(a-b) and FIG. 8(a)-(b) show the changes of catalytic activity with time on stream over the mono Ni metallic catalyst and the Ni—Cu bi-metallic catalysts, respectively.

FIG. 7 shows catalytic performance of the mono Ni metallic catalyst for FIG. 7(a) $CH_4$ and $CO_2$ conversions and FIG. 7(b) $H_2$/CO ratios versus TOS for $CO_2$ reforming of methane at 650° C. and $CH_4$/$CO_2$=1 over 10% Ni/$Al_2O_3$. Reaction conditions: Catalyst weight: 5.5 mg, diluent ($SiO_2$) weight: 100 mg, $CH_4$/$CO_2$/He/Ar: 10/10/68/2, flow rate: 30 mL/min, reaction temperature: 650° C. at atmospheric pressure.

Significant deactivation was observed on Ni/γ-$Al_2O_3$, which showed a linear decrease in the $CH_4$ and $CO_2$ conversions and $H_2$/CO ratio, this could be attributed to carbon deposition and sintering of the catalyst particles. After 70 h of reaction, the $CH_4$ conversion decreased from initial 48% to 1% and the $CO_2$ conversion decreased from initial 59% to 2% for monometallic Ni/γ-$Al_2O_3$. It is worth noting that the 10% (Ni:Cu-8:1)/$Al_2O_3$ catalyst showed stable activity during 70 h of reaction, the conversions of $CH_4$ and $CO_2$ slightly decreased with the initial levels of 80% and 70%, respectively. The 10% (Ni:Cu-8:1)/$Al_2O_3$ catalyst exhibited excellent stability during the whole time on stream investigated, demonstrating a promising catalyst for the $CH_4$—$CO_2$ reforming.

FIG. 8 shows catalytic performance of the Ni—Cu bi-metallic catalysts for FIG. 8(a) $CH_4$ and $CO_2$ conversions and FIG. 8(b) $H_2$/CO ratios versus TOS for $CO_2$ reforming of methane at 650° C. and $CH_4$/$CO_2$=1 over 10% (Ni:Cu-8:1)/$Al_2O_3$. Reaction conditions: Catalyst weight: 5.5 mg, diluent ($SiO_2$) weight: 100 mg, $CH_4$/$CO_2$/He/Ar: 10/10/68/2, flow rate: 30 mL/min, reaction temperature: 650° C. at atmospheric pressure.

The obtained results reveal that there is a suitable amount of Cu loading, above or below which catalytic performance is an apparent decline in performance. The optimum conditions were determined as 10 wt % (Ni:Cu-8:1)/$Al_2O_3$. One plausible reason for the sustained activity of the optimal catalyst is the formation of Ni—Cu alloy, which restricts migration of Ni particles as well as retarding coke formation. This is evident from the characterization of the fresh and spent catalysts by XRD and $H_2$-TPR. These investigations also show that the decoration of active Ni clusters with an optimal amount of Cu has a favorable effect on Ni dispersion, catalyst reducibility and aids in the formation of highly active Ni-enriched Ni—Cu alloy sites. Specifically, TPR results reveal that the introduction of the promoter metal decreases the reduction temperature of the monometallic catalyst. An easier reduction of copper oxide over nickel is also observed. And also $H_2$-TPR indicate that alloying Ni with Cu inhibits $CH_4$ decomposition, and Cu provides sites for $CO_2$ dissociation to yield more active oxygen species suitable for carbon gasification, consequently lowering coke deposition and enhancing catalytic stability. Reduced sample XRD results show that the addition of Cu into Ni changes the crystal structure of metallic Ni, forming the Ni—Cu alloy. The experimental results were compared with ab-initio DFT calculations; it proved that the experimental results are corroborated with ab-initio DFT calculations performed on Cu/Ni bimetallic catalysts. The DFT calculations clearly establish that lower and medium copper loaded Ni/$Al_2O_3$ catalysts are very stable regarding coke resistance and metal sintering.

Various non-exhaustive, non-limiting aspects of catalyst materials and methods for converting carbon dioxide and methane to synthesis gas according to the present disclosure may be useful alone or in combination with one or more other aspect described herein. Without limiting the foregoing description, in a first non-limiting aspect of the present disclosure, a catalyst for converting carbon dioxide and methane to synthesis gas comprises: an alumina-supported copper-nickel alloy composition having the formula $Ni_xCu_y$, wherein the catalyst comprises about 70% to about 98% by weight of alumina in the catalyst, wherein x is an atomic percentage nickel content and y is an atomic percentage copper content, and wherein a ratio of x to y is about 3:1 to about 10:1.

In accordance with a second non-limiting aspect of the present disclosure, which may be used in combination with the first aspect, the ratio of x to y can be about 8:1 to about 10:1.

In accordance with a third non-limiting aspect of the present disclosure, which may be used in combination with each or any of the above-mentioned aspects, the ratio of x to y can be about 8:1.

In accordance with a fourth non-limiting aspect of the present disclosure, which may be used in combination with each or any of the above-mentioned aspects, the catalyst can comprise about 75% to 95% by weight of alumina in the catalyst.

In accordance with a fifth non-limiting aspect of the present disclosure, which may be used in combination with each or any of the above-mentioned aspects, the catalyst can comprise about 90% by weight of alumina in the catalyst.

In accordance with a sixth non-limiting aspect of the present disclosure, which may be used in combination with each or any of the above-mentioned aspects, the ratio of x to y can be about 8:1 to about 10:1, and the catalyst can comprise about 75% to 95% by weight of alumina in the catalyst.

In accordance with a seventh non-limiting aspect of the present disclosure, which may be used in combination with each or any of the above-mentioned aspects, the ratio of x to y can be about 8:1, and the catalyst can comprise about 90% by weight of alumina in the catalyst.

In accordance with an eighth non-limiting aspect of the present disclosure, which may be used in combination with each or any of the above-mentioned aspects, the catalyst can be prepared by a process comprising incipient wetness impregnation.

In accordance with a ninth non-limiting aspect of the present disclosure, a method converting carbon dioxide and methane to synthesis gas methane comprises: processing a feedstock comprising methane and carbon dioxide stream in presence of a catalyst, whereby synthesis gas including carbon monoxide and hydrogen is produced, wherein the catalyst comprises an alumina supported copper-nickel alloy composition having the formula $Ni_xCu_y$, wherein the catalyst comprises about 70% to about 98% by weight of alumina in the catalyst, wherein x is an atomic percentage nickel content and y is an atomic percentage copper content, and wherein a ratio of x to y is about 3:1 to about 10:1.

In accordance with a tenth non-limiting aspect of the present disclosure, which may be used in combination with each or any of the above-mentioned aspects, processing the methane can include dry reforming of the methane.

In accordance with an eleventh non-limiting aspect of the present disclosure, which may be used in combination with each or any of the above-mentioned aspects, a mole ratio of the carbon monoxide to the hydrogen can be about 1:1 at a temperature of about 650° C.

In accordance with a twelfth non-limiting aspect of the present disclosure, which may be used in combination with each or any of the above-mentioned aspects, the ratio of x to y can be about 8:1 to about 10:1.

In accordance with a thirteenth non-limiting aspect of the present disclosure, which may be used in combination with each or any of the above-mentioned aspects, the ratio of x to y can be about 8:1.

In accordance with a fourteenth non-limiting aspect of the present disclosure, which may be used in combination with each or any of the above-mentioned aspects, the catalyst can comprise about 75% to 95% by weight of alumina in the catalyst.

In accordance with a fifteenth non-limiting aspect of the present disclosure, which may be used in combination with each or any of the above-mentioned aspects, the catalyst can comprise about 90% by weight of alumina in the catalyst.

In accordance with a sixteenth non-limiting aspect of the present disclosure, which may be used in combination with each or any of the above-mentioned aspects, the ratio of x to y can be about 8:1 to about 10:1, and the catalyst can comprise about 75% to 95% by weight of alumina in the catalyst.

In accordance with a seventeenth non-limiting aspect of the present disclosure, which may be used in combination with each or any of the above-mentioned aspects, the ratio of x to y can be about 8:1, and the catalyst can comprise about 90% by weight of alumina in the catalyst.

In accordance with an eighteenth non-limiting aspect of the present disclosure, which may be used in combination with each or any of the above-mentioned aspects, the catalyst can be prepared by a process comprising incipient wetness impregnation.

In accordance with a nineteenth non-limiting aspect of the present disclosure, which may be used in combination with each or any of the above-mentioned aspects, the ratio can be selected using an ab-initio density functional theory calculation for an activation barrier of processing the methane.

In accordance with a twentieth non-limiting aspect of the present disclosure, which may be used in combination with each or any of the above-mentioned aspects, the ratio can be selected using an ab-initio density functional theory calculation for each elementary reaction of dry reforming of the methane.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A catalyst for converting methane and carbon dioxide to synthesis gas, the catalyst comprising:
   an alumina-supported copper-nickel alloy composition having a formula $Ni_xCu_y$, wherein x is an atomic percentage nickel content and y is an atomic percentage copper content, and wherein a ratio of x to y is about 3:1 to about 10:1,
   wherein the catalyst comprises about 70% to about 98% by weight of alumina in the catalyst.

2. The catalyst of claim 1, wherein the ratio of x to y is about 5:1 to about 9:1.

3. The catalyst of claim 1, wherein the ratio of x to y is about 8:1 to about 10:1.

4. The catalyst of claim 1, wherein the ratio of x to y is about 8:1.

5. The catalyst of claim 1, wherein the catalyst is prepared by a process comprising incipient wetness impregnation.

6. The catalyst of claim 1, wherein the catalyst retains at least 99% of its optimized activity after at least 10 hours' catalysis reaction.

7. The catalyst of claim 6, wherein the optimized activity is either $CH_4$ conversion or $CO_2$ conversion.

8. The catalyst of claim 1, wherein the catalyst retains about 100% of its initial activity after at least 10 hours' catalysis reaction.

9. The catalyst of claim 8, wherein the initial activity is either $CH_4$ conversion or $CO_2$ conversion.

10. The catalyst of claim 1, wherein the catalyst retains at least 70% of its initial activity after at least 70 hours' catalysis reaction.

11. The catalyst of claim 10, wherein the initial activity is either $CH_4$ conversion or $CO_2$ conversion.

12. The catalyst of claim 1, wherein an XRD pattern of the catalyst has peaks at 2 θ=44.4° and 51.7°.

13. A method for converting carbon dioxide and methane to synthesis gas, the method comprising:
processing a feedstock comprising methane and carbon dioxide stream in presence of a catalyst, whereby the synthesis gas including carbon monoxide and hydrogen is produced, wherein the catalyst comprises an alumina-supported copper-nickel alloy composition having a formula $Ni_xCu_y$, wherein x is an atomic percentage nickel content and y is an atomic percentage copper content, and wherein a ratio of x to y is about 3:1 to about 10:1,
wherein the catalyst comprises about 70% to about 98% by weight of alumina in the catalyst.

14. The method of claim 13, wherein the method includes dry reforming of the methane.

15. The method of claim 13, wherein the catalyst is prepared by a process comprising incipient wetness impregnation.

16. The method of claim 13, wherein the ratio of x to y is selected by using an ab-initio density functional theory calculation for an activation barrier of processing the methane.

17. The method of claim 13, wherein the ratio of x to y is selected by using an ab-initio density functional theory calculation for each elementary reaction of dry reforming of the methane.

18. The method of claim 13, wherein a conversion percentage of methane is in a range of 1-80%.

19. The method of claim 13, wherein a conversion percentage of $CO_2$ is in a range of 1-90%.

20. The method of claim 13, wherein a $H_2/CO$ ratio of the synthesis gas obtained is in a range of 1-1.2.

21. The method of claim 13, wherein the catalyst retains about 100% of its optimized activity after at least 10 hours' catalysis reaction.

22. The method of claim 21, wherein the optimized activity is either $CH_4$ conversion or $CO_2$ conversion.

23. The method of claim 13, wherein the catalyst retains at least about 70% of its initial activity after at least 70 hours' catalysis reaction.

24. The method of claim 23, wherein the initial activity is either $CH_4$ conversion or $CO_2$ conversion.

25. A catalyst for converting methane and carbon dioxide to synthesis gas, the catalyst comprising:
an alumina-supported copper-nickel alloy composition having a formula $Ni_xCu_y$, wherein x is an atomic percentage nickel content and y is an atomic percentage copper content, and,
wherein a ratio of x to y is about 5:1 to about 9:1.

26. The catalyst of claim 25, wherein the ratio of x to y is about 5:1 to about 8:1.

27. The catalyst of claim 25, wherein the ratio of x to y is about 8:1.

28. A method for converting carbon dioxide and methane to synthesis gas, the method comprising:
processing a feedstock comprising methane and carbon dioxide stream in presence of a catalyst, whereby the synthesis gas including carbon monoxide and hydrogen is produced, wherein the catalyst comprises an alumina-supported copper-nickel alloy composition having a formula $Ni_xCu_y$, wherein x is an atomic percentage nickel content and y is an atomic percentage copper content, and wherein a ratio of x to y is about 3:1 to about 10:1,
wherein the ratio of x to y is selected by using an ab-initio density functional theory calculation for an activation barrier of processing the methane.

29. A method for converting carbon dioxide and methane to synthesis gas, the method comprising:
processing a feedstock comprising methane and carbon dioxide stream in presence of a catalyst, whereby the synthesis gas including carbon monoxide and hydrogen is produced, wherein the catalyst comprises an alumina-supported copper-nickel alloy composition having a formula $Ni_xCu_y$, wherein x is an atomic percentage nickel content and y is an atomic percentage copper content, and wherein a ratio of x to y is about 3:1 to about 10:1,
wherein the ratio of x to y is selected by using an ab-initio density functional theory calculation for each elementary reaction of dry reforming of the methane.

30. A method for converting carbon dioxide and methane to synthesis gas, the method comprising:
processing a feedstock comprising methane and carbon dioxide stream in presence of a catalyst, whereby the synthesis gas including carbon monoxide and hydrogen is produced, wherein the catalyst comprises an alumina-supported copper-nickel alloy composition having a formula $Ni_xCu_y$, wherein x is an atomic percentage nickel content and y is an atomic percentage copper content, and wherein a ratio of x to y is about 3:1 to about 10:1,
wherein a conversion percentage of methane is in a range of 1-80%.

31. A method for converting carbon dioxide and methane to synthesis gas, the method comprising:
processing a feedstock comprising methane and carbon dioxide stream in presence of a catalyst, whereby the synthesis gas including carbon monoxide and hydrogen is produced, wherein the catalyst comprises an alumina-supported copper-nickel alloy composition having a formula $Ni_xCu_y$, wherein x is an atomic percentage nickel content and y is an atomic percentage copper content, and wherein a ratio of x to y is about 3:1 to about 10:1,
wherein a conversion percentage of $CO_2$ is in a range of 1-90%.

32. A method for converting carbon dioxide and methane to synthesis gas, the method comprising:
processing a feedstock comprising methane and carbon dioxide stream in presence of a catalyst, whereby the synthesis gas including carbon monoxide and hydrogen is produced, wherein the catalyst comprises an alumina-supported copper-nickel alloy composition having a formula $Ni_xCu_y$, wherein x is an atomic percentage nickel content and y is an atomic percentage copper content, and wherein a ratio of x to y is about 3:1 to about 10:1,
wherein a $H_2/CO$ ratio of the synthesis gas obtained is in a range of 1-1.2.

* * * * *